Patented Sept. 9, 1941

2,255,463

UNITED STATES PATENT OFFICE 2,255,463

TREATMENT BATH AND PROCESS FOR THE PRODUCTION OF COLORED PHOTOGRAPHIC PICTURES

Béla Gáspár, Hollywood, Calif., assignor to Chromogen, Incorporated, a corporation of Nevada No Drawing. Application May 27, 1939, Serial No. 276,239. In Germany May 30, 1938

18 Claims. (Cl. 95—6)

It is known that colored photographic pictures can be produced from uniformly-colored silver images by local destruction of the dye in a bath that destroys the dye at the areas where silver is present. For this purpose it has been proposed to use baths consisting of, for instance, 2% hydroiodic acid or 11% hydrochloric acid. Although these baths are quite suitable for the production of colored pictures according to the above-mentioned process, the process of the present invention provides a more preservative treatment of the photographic layer and the apparatus, as well as avoiding the expense incurred in using hydroiodic acid, by employing acid baths with a high content of chlorides accompanied by a low content of acid, the amount of the latter being generally but a fraction of the quantity of acid that would be the chemical equivalent of the chloride present. For instance, an aqueous solution having a sodium chloride content of 20% and having a hydrochloric acid content of 3.6%, contains approximately 3.3 equivalents of sodium chloride per one equivalent of the hydrochloric acid. The content of sodium chloride, expressed in equivalents, is thus considerably in excess to the content of hydrochloric acid also expressed in equivalents.

Especially suitable for the preparation of the solutions are, for instance, sodium chloride, ammonium chloride, calcium chloride or magnesium chloride. The solutions contain the salts in concentrations varying from about 5% to the limits of solubility, and in addition, for instance, 3% to 4% of hydrochloric acid. Nevertheless, very much smaller proportions of acid yield effective treatment baths, and it follows as a matter of course that larger amounts of acid may also be used; however, by the employment of salts such an increase in the proportion of acid can be avoided.

The effect of the new baths may be still further accelerated to a considerable extent by the addition of organic substances acting as catalysts; suitable for this purpose are, for instance, the substances mentioned in my co-pending application Ser. No. 179,591, filed December 13, 1937, of which the present application is a continuation-in-part.

The new baths are suitable for the treatment of silver images that are dyed with the dyes usual for the production of photographic dye images by the local destruction of reducible dyes in the presence of metallic silver.

Dyes that are in themselves difficult of bleaching are particularly useful in demonstrating the action of the new baths, and the following comparative experiments with the blue dye "Congoreinblau" (Schultz Farbstofftabellen, Leipzig 1931, 7th ed., vol. 1, No. 513) show the effects very clearly.

Photographic layers containing a silver image dyed with the said Congoreinblau, are treated in the following baths for 30 minutes and at a temperature of 18° C. in each case:

1. 20% aqueous sodium chloride solution.
2. 20% aqueous ammonium chloride solution.
3. 20% aqueous calcium chloride solution.
4. 20% aqueous magnesium chloride solution.
5. 3.6% aqueous hydrochloric acid.
6. Aqueous solution of 20% sodium chloride and 3.6% hydrochloric acid.
7. Aqueous solution of 20% ammonium chloride and 3.6% hydrochloric acid.
8. Aqueous solution of 20% calcium chloride and 3.6% hydrochloric acid.
9. Aqueous solution of 20% magnesium chloride and 3.6% hydrochloric acid.

Whilst the baths in baths Nos. 1 to 5, which deal with solutions containing chlorides alone or only hydrochloric acid of a weak concentration, show no effect on the dye, the baths according to the present invention and exemplified by Nos. 6 to 9, yield dye-images that however do not show fully bleached areas until after a prolonged treatment.

If catalysts are added to the baths according to baths Nos. 6 to 9, fully bleached areas will be obtained after but 30 minutes treatment. To attain this reslt, the solutions might be saturated with 2,3 - diaminophenazine, 2 - oxy - 3 - aminophenazine, 2,3-dimethylquinoxaline or anthraquinone-β-sulphonic acid.

What is claimed is:

1. In a process for the production of colored photographic pictures by means of local destruction of dye at areas where metallic silver is present in a layer uniformly dyed with a reducible dye, the treatment of said layer with an acid bath comprising hydrohalic acid and a quantity of hydrohalic acid salts exceeding the quantity of acid, both quantities expressed in terms of chemical equivalent weights.

2. In a process for the production of colored photographic pictures by means of local destruction of dye at areas where metallic silver is present in a layer uniformly dyed with a reducible dye, the treatment of said layer with an acid bath comprising approximately 0.8 to 1.1 gram equivalents of hydrohalic acid per liter and an excess of hydrohalic acid salt, said quantities expressed in terms of chemical equivalent weights.

3. In a process for the production of colored photographic pictures by means of local destruction of dye at areas where metallic silver is present in a layer uniformly dyed with a reducible dye, the treatment of said layer with an acid bath comprising hydrohalic acid and approximately 1.6 to 4 equivalents of hydrohalic acid salt per equivalent of said acid, said quantities expressed in terms of chemical equivalent weights of said substances.

4. In a process for the production of colored photographic pictures by means of local destruction of dye at areas where metallic silver is present in a layer uniformly dyed with a reducible dye, the treatment of said layer with an acid bath comprising hydrochloric acid and a quantity of hydrochloric acid salts exceeding the quantity of acid, both quantities expressed in terms of chemical equivalent weights.

5. In a process for the production of colored photographic pictures by means of local destruction of dye at areas where metallic silver is present in a layer uniformly dyed with a reducible dye, the treatment of said layer with an acid bath comprising approximately 0.8 to 1.1 gram equivalents of hydrochloric acid per liter and an excess of hydrochloric acid salt, said quantities expressed in terms of chemical equivalent weights.

6. In a process for the production of colored photographic pictures by means of local destruction of dye at areas where metallic silver is present in a layer uniformly dyed with a reducible dye, the treatment of said layer with an acid bath comprising hydrochloric acid and approximately 1.6 to 4 equivalents of hydrochloric acid salt per equivalent of said acid, said quantities expressed in terms of chemical equivalent weights of said substances.

7. In a process for the production of colored photographic pictures by means of local destruction of dye at areas where metallic silver is present in a layer uniformly dyed with a reducible dye, the treatment of said layer with an acid bath comprising hydrochloric acid and a quantity of hydrochloric acid salts exceeding the quantity of acid, both quantities expressed in terms of chemical equivalent weights, said bath further comprising a quantity of an organic catalyst.

8. In a process for the production of colored photographic pictures by means of local destruction of dye at areas where metallic silver is present in a layer uniformly dyed with a reducible dye, the treatment of said layer with an acid bath comprising approximately 0.8 to 1.1 gram equivalents of hydrochloric acid per liter and an excess of hydrochloric acid salt, said quantities expressed in terms of chemical equivalent weights, said bath further comprising a quantity of an organic catalyst.

9. In a process for the production of colored photographic pictures by means of local destruction of dye at areas where metallic silver is present in a layer uniformly dyed with a reducible dye, the treatment of said layer with an acid bath comprising hydrochloric acid and approximately 1.6 to 4 equivalents of hydrochloric acid salt per equivalent of said acid, said quantities expressed in terms of chemical equivalent weights of said substances, said bath further comprising a quantity of an organic catalyst.

10. In a process for the production of colored photographic pictures by means of local destruction of dye at areas where metallic silver is present in a layer uniformly dyed with a reducible dye, the treatment of said layer with an acid bath comprising about 3% of hydrochloric acid and further comprising about 15% of hydrochloric acid salt selected from the group consisting of alkali chlorides, earth alkali chlorides and ammonium chloride.

11. In a process for the production of colored photographic pictures by means of local destruction of dye at areas where metallic silver is present in a layer uniformly dyed with a reducible dye, the treatment of said layer with an acid bath comprising about 3% of hydrochloric acid and further comprising about 15% of hydrochloric acid salt selected from the group consisting of alkali chlorides, earth alkali chlorides and ammonium chloride, said bath further comprising a quantity of an organic catalyst.

12. In a process for the production of colored photographic pictures by means of local destruction of dye at areas where metallic silver is present in a layer uniformly dyed with a reducible dye, the treatment of said layer with an acid bath comprising hydrochloric acid and further comprising more than 5% of a hydrochloric acid salt selected from the group consisting of alkali chlorides, earth alkali chlorides and ammonium chloride, the quantity of said hydrochloric acid salt exceeding the quantity of hydrochloric acid, both quantities expressed in terms of chemical equivalent weights.

13. In a process for the production of colored photographic pictures by means of local destruction of dye at areas where metallic silver is present in a layer uniformly dyed with a reducible dye, the treatment of said layer with an acid bath comprising hydrochloric acid and further comprising more than 5% of a hydrochloric acid salt selected from the group consisting of alkali chlorides, earth alkali chlorides and ammonium chloride, the quantity of said hydrochloric acid salt exceeding the quantity of hydrochloric acid, both quantities expressed in terms of chemical equivalent weights, said bath further comprising a quantity of organic catalyst.

14. In a process for the production of colored photographic pictures by means of local destruction of dye at areas where metallic silver is present in a layer uniformly dyed with a reducible dye, the treatment of said layer with a solution comprising a hydrohalic acid and a quantity of a hydrohalic acid salt in excess of the quantity of said acid, both quantities expressed in terms of chemical equivalent weights, the concentration of said salt ranging from 5 per cent to the limit of solubility.

15. In a process for the production of colored photographic pictures by means of local destruction of dye at areas where metallic silver is present in a layer uniformly dyed with a reducible dye, the treatment of said layer with a solution comprising a hydrohalic acid and a quantity of a hydrohalic acid salt in excess of the quantity of said acid, both quantities expressed in terms of chemical equivalent weights, the concentration of said salt ranging from 5 per cent to the limit of solubility, said solution further comprising a quantity of an organic catalyst.

16. A dye destruction bath for locally destroying dye in the production of colored photographic pictures at areas where metallic silver is present in a layer uniformly dyed with a reducible dye comprising a hydrohalic acid and a quantity of hydrohalic acid salts exceeding the quantity of said acid, both quantities expressed in terms of chemical equivalent weights, and a quantity of an organic catalyst capable of accelerating the dye destruction.

17. A dye destruction bath for locally destroying dye in the production of colored photographic pictures at areas where metallic silver is present in a layer uniformly dyed with a reducible dye comprising a hydrohalic acid and a quantity of a hydrohalic acid salt in excess of the quantity of said acid, both quantities expressed in terms of chemical equivalent weights, the concentration of said salt ranging from 5 per cent to the limit of solubility and a quantity of an organic catalyst capable of accelerating the dye destruction.

18. A dye destruction bath for locally destroying dye in the production of colored photographic pictures at areas where metallic silver is present in a layer uniformly dyed with a reducible dye comprising hydrochloric acid and more than 5 per cent of a hydrochloric acid salt selected from the group consisting of alkali chlorides, earth alkali chlorides and ammonium chloride, the quantity of said hydrochloric acid salt exceeding the quantity of hydrochloric acid, both quantities expressed in terms of chemical equivalent weights, and a quantity of an organic catalyst capable of accelerating the dye destruction.

BÉLA GÁSPÁR.